(12) United States Patent
You et al.

(10) Patent No.: US 11,505,029 B2
(45) Date of Patent: Nov. 22, 2022

(54) AIR CONDITIONER FOR VEHICLE

(71) Applicant: Hanon Systems, Daejeon (KR)

(72) Inventors: Jae-Chun You, Daejeon (KR); Yun Jin Kim, Daejeon (KR); Yo Chan Min, Daejeon (KR); Tae Yong Park, Daejeon (KR); Sung Je Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 681 days.

(21) Appl. No.: 16/542,649

(22) Filed: Aug. 16, 2019

(65) Prior Publication Data

US 2020/0055365 A1    Feb. 20, 2020

(30) Foreign Application Priority Data

Aug. 20, 2018 (KR) .................. 10-2018-0096655
Aug. 23, 2018 (KR) .................. 10-2018-0098526

(51) Int. Cl.
*B60H 1/00* (2006.01)
*B60H 1/32* (2006.01)

(52) U.S. Cl.
CPC ....... *B60H 1/00028* (2013.01); *B60H 1/3227* (2013.01); *B60H 2001/0015* (2013.01); *B60H 2001/00121* (2013.01)

(58) Field of Classification Search
CPC .............. B60H 1/00028; B60H 1/3227; B60H 2001/00121; B60H 2001/00128; B60H 2001/0015
See application file for complete search history.

(56) References Cited

U.S. PATENT DOCUMENTS

| 2009/0165991 A1* | 7/2009 | Komaba ............ B60H 1/00028 165/42 |
| 2015/0043898 A1* | 2/2015 | Gu ........................ B60H 1/2225 392/360 |
| 2017/0203631 A1* | 7/2017 | Ryu .................... B60H 1/00028 |
| 2019/0344639 A1* | 11/2019 | Benamira .......... B60H 1/00871 |

FOREIGN PATENT DOCUMENTS

| CN | 205836447 U | 12/2016 |
| KR | 101251206 B1 | 4/2013 |

OTHER PUBLICATIONS

Office Action dated Aug. 19, 2022 by the CIPO in the corresponding Patent Application No. CN 201910767240.7, with English translation.

* cited by examiner

*Primary Examiner* — Marc E Norman
(74) *Attorney, Agent, or Firm* — Norton Rose Fulbright US LLP; James R. Crawford

(57) ABSTRACT

The present invention relates to an air conditioner for a vehicle, and more particularly, to an air conditioner for a vehicle in which heating performance may be improved using an auxiliary heating heat exchanger and stability of a passenger may be improved by providing the auxiliary heating heat exchanger in an engine room.

15 Claims, 12 Drawing Sheets

AIR CONDITIONER FOR VEHICLE

CROSS-REFERENCE TO RELATED APPLICATIONS

This application claims priority under 35 U.S.C. § 119 to Korean Patent Application No. 10-2018-0096655, filed on Aug. 20, 2018 and Korean Patent Application No. 10-2018-0098526 filed on Aug. 23, 2018, in the Korean Intellectual Property Office, the disclosure of which is incorporated herein by reference in its entirety.

TECHNICAL FIELD

The following disclosure relates to an air conditioner for a vehicle, and more particularly, to an air conditioner for a vehicle in which heating performance may be improved using an auxiliary heating heat exchanger and stability of a passenger may be improved by providing the auxiliary heating heat exchanger in an engine room.

BACKGROUND

A general air conditioner system for a vehicle is configured by connecting a compressor compressing and sending a refrigerant, a condenser condensing a high-pressure refrigerant sent from the compressor, an expansion means throttling the refrigerant condensed and liquefied by the condenser, an evaporator heat-exchanging a low-pressure liquid-phase refrigerant throttled by the expansion means with air blown toward the interior of the vehicle to evaporate the low-pressure liquid-phase refrigerant and thus cool air discharged to the interior by a heat absorbing action due to latent heat of evaporation of the refrigerant, and the like, to each other by refrigerant pipes.

The evaporator is installed in an air conditioning case installed in the interior of the vehicle interior to play a cooling role. That is, air blown by a blower is cooled by the latent heat of evaporation of the liquid-phase refrigerant circulated within the evaporator while passing through the evaporator and is discharged to the interior of the vehicle in a cold state, such that cooling is conducted.

In addition, in heating of the interior of the vehicle, a heater core which is installed in the air conditioning case and in which an engine coolant is circulated or an electric heater installed in the air conditioning case is used.

Meanwhile, the condenser is installed on a front side of the vehicle, and radiates heat while exchanging the heat with the air.

Recently, a heat pump system performing cooling and heating using only a cooling cycle has been developed. The heat pump system has a structure in which a cold air passage 11 and a warm air passage 12 are formed in one air conditioning case 10 so as to be partitioned, an evaporator 4 for cooling is installed in the cold air passage 11, and a condenser 2 for heating is installed in the warm air passage 12, as illustrated in FIG. 1. In this case, air discharging ports 15 supplying air to the interior of the vehicle and an air exhausting port 16 exhausting air to the outside of the interior of the vehicle are formed at an outlet side of the air conditioning case 10. In addition, blowers 20 that are individually operated are installed at inlet sides of the cold air passage 11 and the warm air passage 12, respectively.

Therefore, in a cooling mode, cold air cooled while passing the evaporator 4 of the cold air passage 11 is discharged to the interior of the vehicle through the air discharging ports 15 to perform the cooling. In this case, warm air heated while passing through the condenser 2 of the warm air passage 12 is exhausted to the outside of the interior of the vehicle through the air exhausting port 16.

In a heating mode, the warm air heated while passing through the condenser 2 of the warm air passage 12 is discharged to the interior of the vehicle through the air discharging ports 15 to perform the heating. In this case, the cold air cooled while passing through the evaporator 4 of the cold air passage 11 is exhausted to the outside of the interior of the vehicle through the air exhausting port 16.

However, in the related art, in a very low temperature environment of winter, a temperature of air introduced into the evaporator drops, such that the air does not smoothly absorb heat, and a temperature and a pressure of a refrigerant in the entire system drop, such that a temperature of air discharged to the interior of the vehicle drops, resulting in rapid deterioration of heating performance.

In addition, when a surface temperature of the evaporator drops to the freezing point or more, a frost is generated on a surface of the evaporator. When the frost is generated as described above, the evaporator does not smoothly absorb heat, and a defrost operation such as stopping the system should be performed, and thus, the heating performance is further deteriorated.

Meanwhile, an example in which a separate auxiliary heating means is used in addition to the condenser in order to improve the heating performance has been used. However, in a case in which the auxiliary heating means is provided in the interior of the vehicle, it is operated at a high voltage, which has an influence on safety of a driver. In addition, an operation of the blower causes noise to a passenger of the interior of the vehicle. Therefore, a method capable of minimizing the operation of the blower and adjusting a temperature of the interior of the vehicle as well as effectively performing dehumidification has been required.

RELATED ART DOCUMENT

Patent Document

Patent Document 1: Korean Patent No. 10-1251206, entitled "Air-Conditioner without Starting Engine for Vehicle".

SUMMARY

An embodiment of the present invention is directed to providing an air conditioner for a vehicle in which heating performance may be improved using an auxiliary heating heat exchanger and stability of a passenger may be improved by providing the auxiliary heating heat exchanger in an engine room.

In this case, an embodiment of the present invention is directed to providing an air conditioner for a vehicle in which an auxiliary heating heat exchanger may be provided in parallel with an interior heat exchanger behind the interior heat exchanger in an air flow direction and may be provided between a first temperature door and an interior discharging port, such that air supplied from a second region may pass through only an evaporator and be supplied in a cooled state to secure a sufficient cooling air volume.

Particularly, an embodiment of the present invention is directed to providing an air conditioner for a vehicle in which an auxiliary heating heat exchanger may be provided between a first temperature door and an interior discharging port to heat only air passing through an interior heat exchanger and discharged to the interior with the exception of air passing through a first air exhausting port, resulting in improvement of heating performance.

Further, an embodiment of the present invention is directed to providing an air conditioner for a vehicle capable of including an air conditioning case in an engine room, being easily connected to the interior of a vehicle, and being miniaturized by forming an internal air introducing port and an interior discharging port in the same surface of the air conditioning case.

Further, an embodiment of the present invention is directed to providing an air conditioner for a vehicle capable of reducing consumed power and generated noise by operating only a second blower in a second region using a backward flow preventing door preventing air passing through an evaporator and moved to an interior heat exchanger from flowing backward to a first region to perform a dehumidifying mode.

Further, an embodiment of the present invention is directed to providing an air conditioner for a vehicle capable of stably implementing cooling, heating, and dehumidifying modes by operations of a first temperature door, a second temperature door, an adjusting door, and a backward flow preventing door.

In one general aspect, an air conditioner 1000 for a vehicle includes: an air conditioning case 100 which is in communication with the interior of the vehicle and in which wind for conditioning air of the interior flows; and an interior heat exchanger 300 and an auxiliary heating heat exchanger 310 which are disposed in the air conditioning case 100 and heat air discharged to the interior of the vehicle, wherein the auxiliary heating heat exchanger 310 is provided in an engine room.

The auxiliary heating heat exchanger 310 may use a positive temperature coefficient (PTC) heating means.

A first region 100A in which air for heating is blown and a second region 100B in which air for cooling is blown may be formed in the air conditioning case 100, and a first blower 210 may be provided in the first region 100A and a second blower 220 may be provided in the second region 100B.

The air conditioning case 100 may include an evaporator 400 disposed in the air conditioning case 100 and cooling the air discharged to the interior of the vehicle.

The air conditioning case 100 may include: an interior discharging port 140 through which the air passing through the interior heat exchanger 300 or the evaporator 400 is supplied to the interior of the vehicle; a first air exhausting port 151 through which the air passing through the interior heat exchanger 300 is exhausted to the outside of the interior; and a second air exhausting port 152 through which the air passing through the evaporator 400 is exhausted to the outside of the interior.

The air conditioner 1000 for a vehicle may further include: a first temperature door 161 adjusting an opening level of the interior discharging port 140 and the first air exhausting port 151 to adjust a flow of the air passing through the interior heat exchanger 300; and a second temperature door 162 adjusting an opening level of the interior discharging port 140 and the second air exhausting port 152 to adjust a flow of the air passing through the evaporator 400.

The air conditioner 1000 for a vehicle may further include an adjusting door 170 adjusting a level at which the air passing through the evaporator 400 passes through the interior heat exchanger 300.

The auxiliary heating heat exchanger 310 may be provided in parallel with the interior heat exchanger 300 behind the interior heat exchanger 300 in an air flow direction.

The auxiliary heating heat exchanger 310 may be provided between the first temperature door 161 and the interior discharging port 140 and heat only the air discharged to the interior.

In the air conditioning case 100, an external air introducing port 110 through which external air is introduced and an internal air introducing port 120 through which internal air is introduced may be hollowed.

The internal air introducing port 120 and the interior discharging port 140 may be formed in the same surface of the air conditioning case 100.

The air conditioner 1000 for a vehicle may further include: a first internal/external air door 131 adjusting introduction of the internal air and the external air into the first region 100A; and a second internal/external air door 132 adjusting introduction of the internal air and the external air into second region 100B.

The air conditioner 1000 for a vehicle may further include a filter 500 disposed between the first and second internal/external air doors 131 and 132 and the external air introducing port 110.

DETAILED DESCRIPTION OF EMBODIMENTS

Hereinafter, an air conditioner 1000 for a vehicle having the configuration described above will be described in detail with reference to the accompanying drawings.

Figure 1:
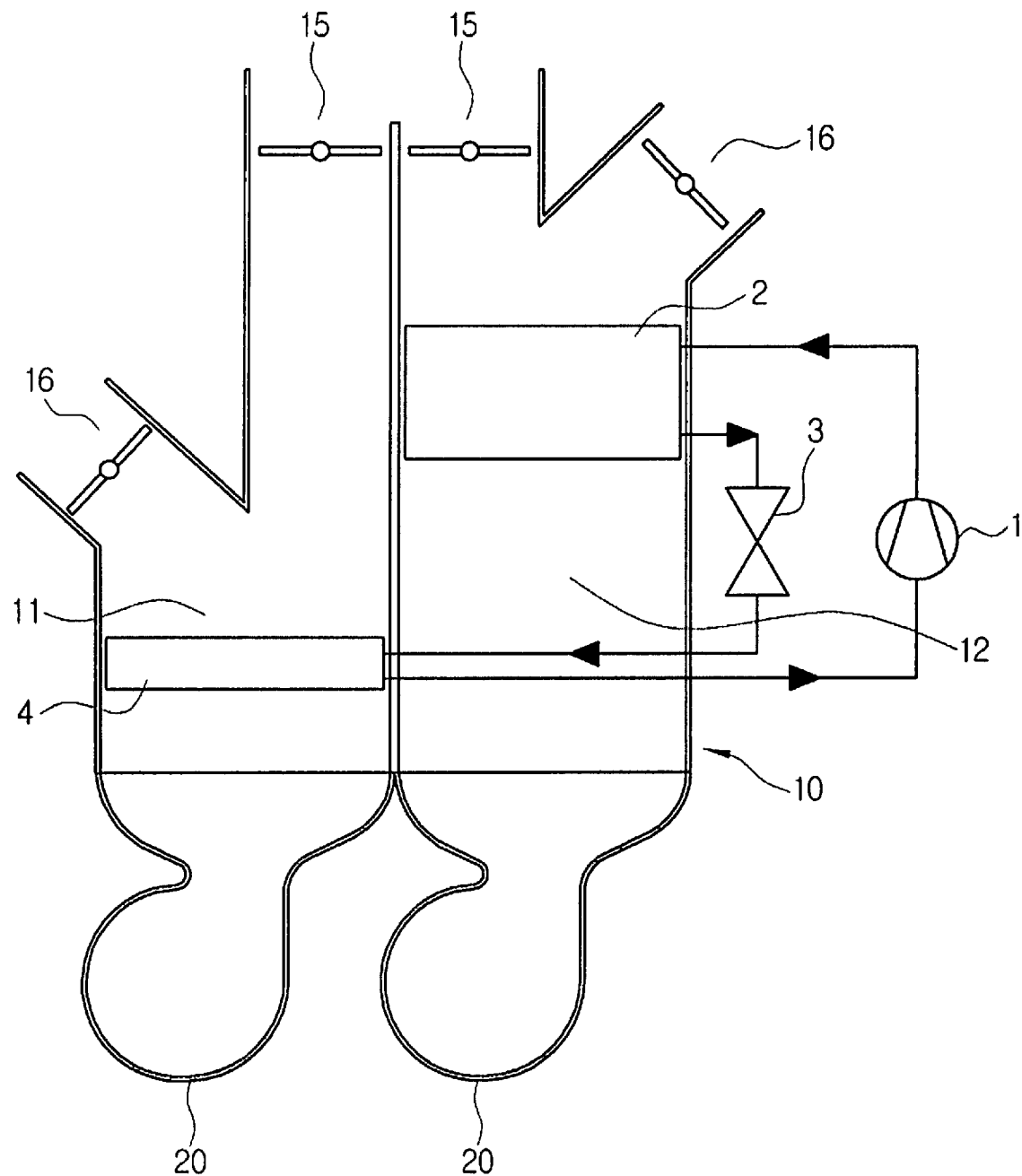
FIG. 1 is a view illustrating a heat pump system for a vehicle according to the related art.
Figure 2:
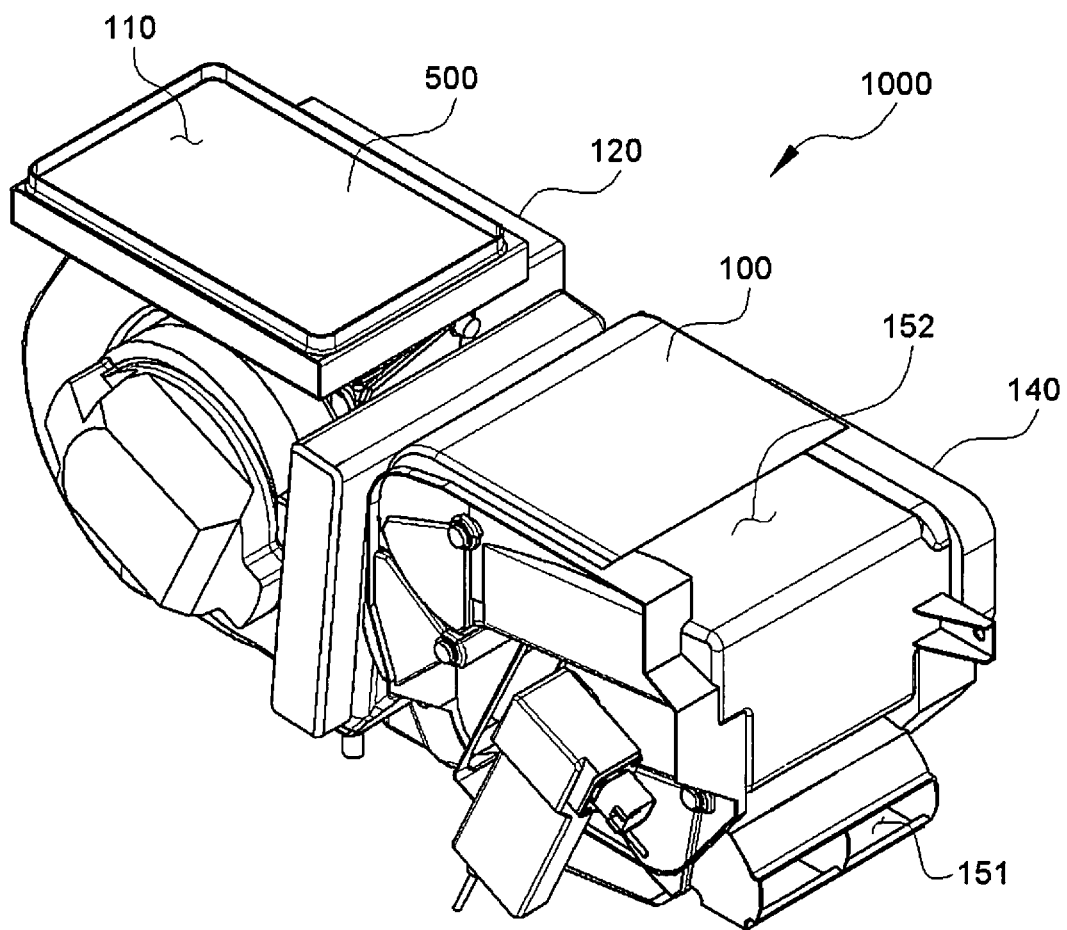
FIGS. 2 and 3 are perspective views illustrating an air conditioner for a vehicle according to the present invention when viewed from different directions, respectively.
Figure 3:
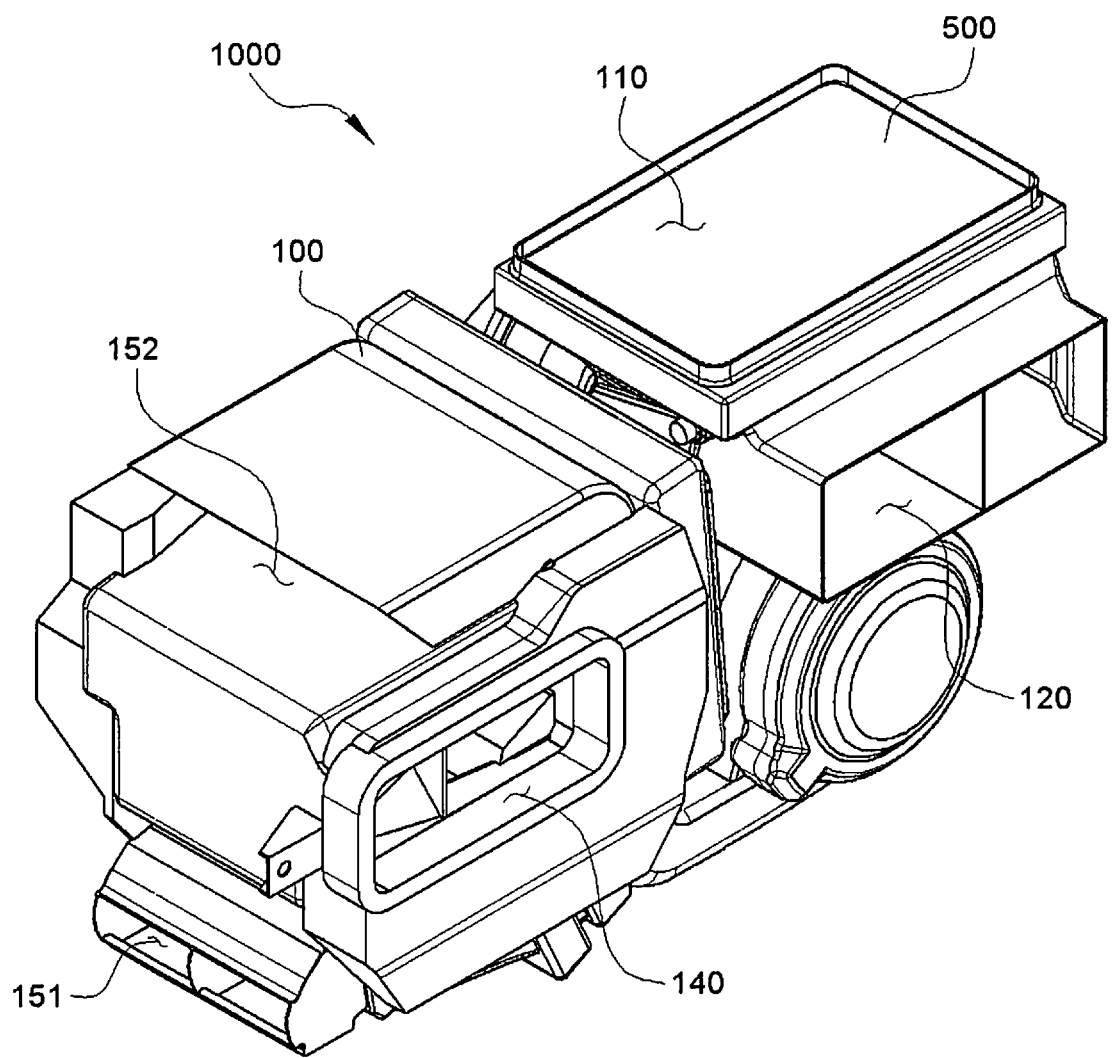
Figure 4:
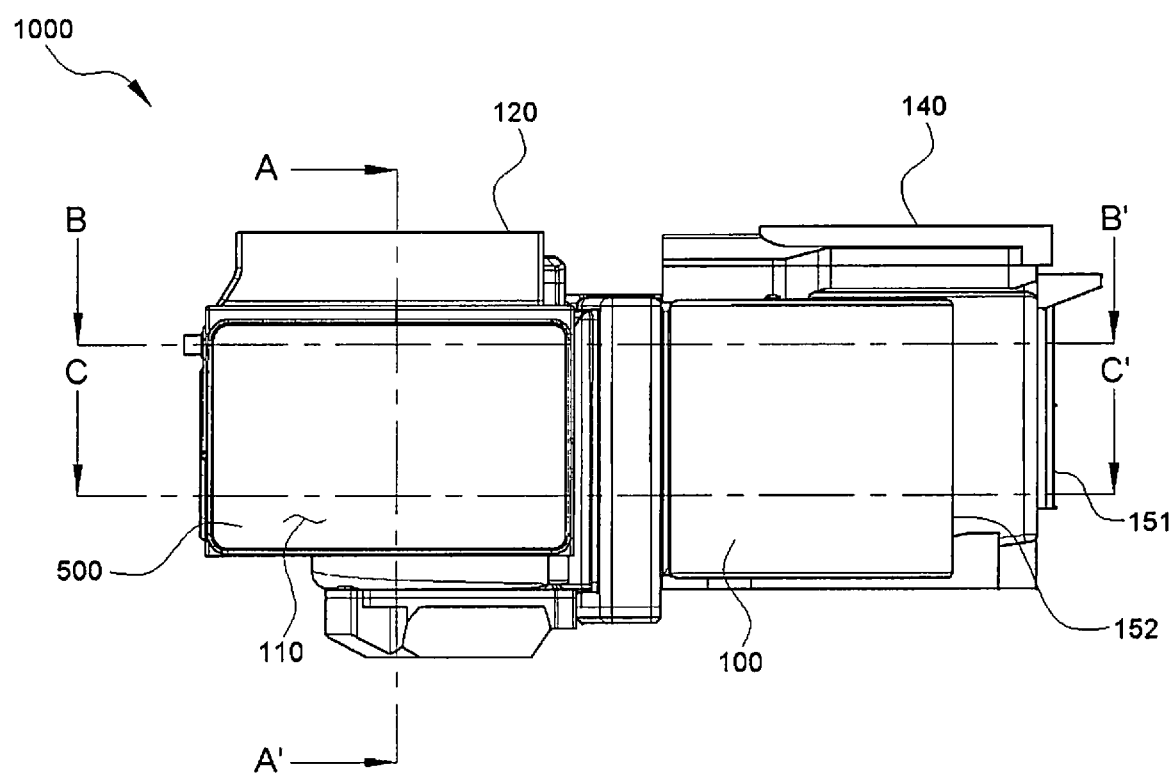
FIG. 4 is a top view of the air conditioner for a vehicle according to the present invention.
Figure 5:
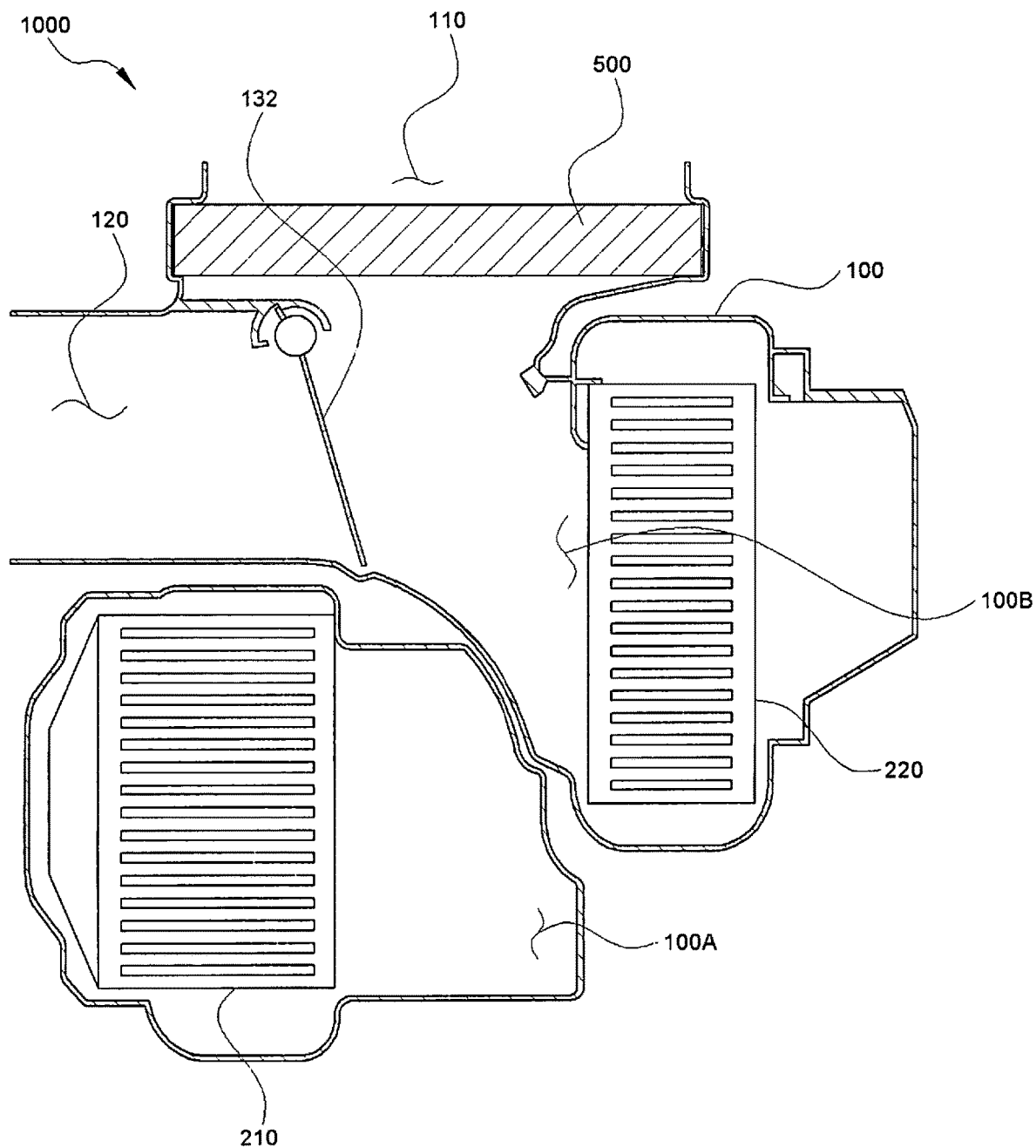
FIGS. 5 to 7 are cross-sectional views taken along line A-A', line B-B', and line C-C' of FIG. 4.
Figure 6:
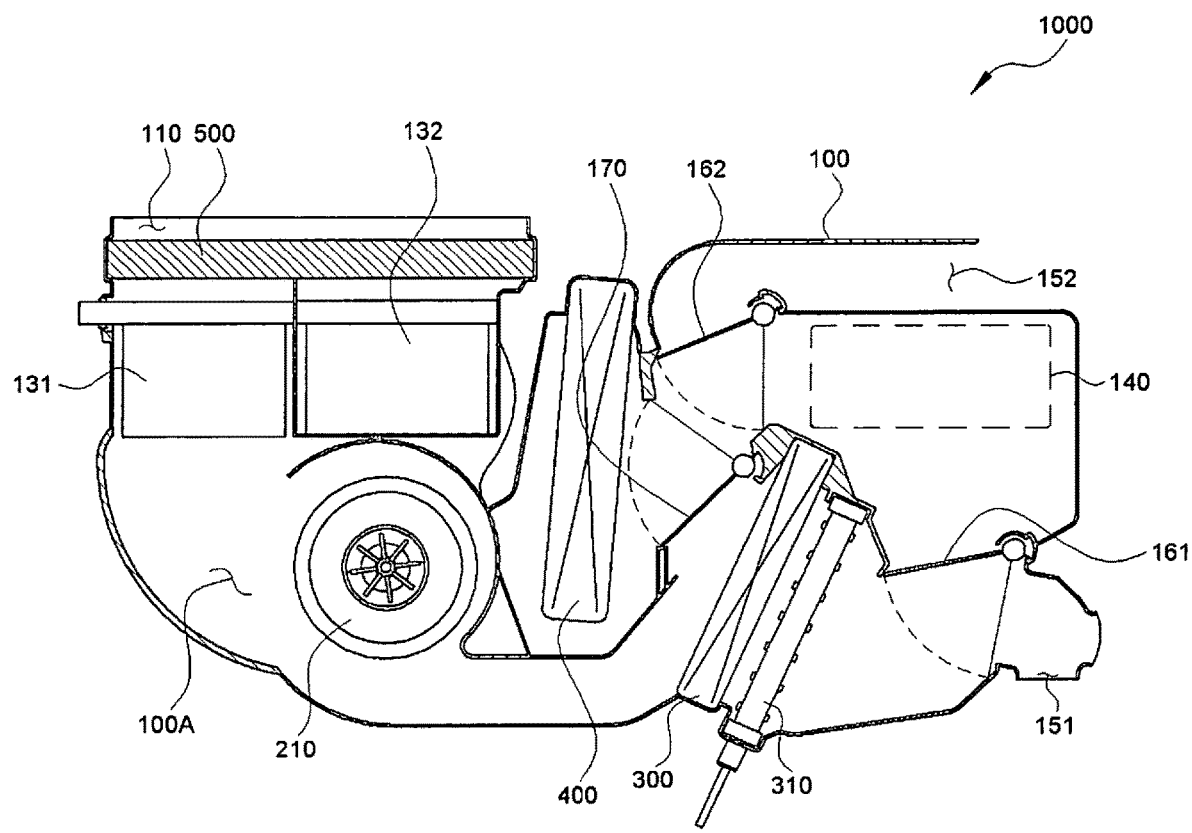
Figure 7:
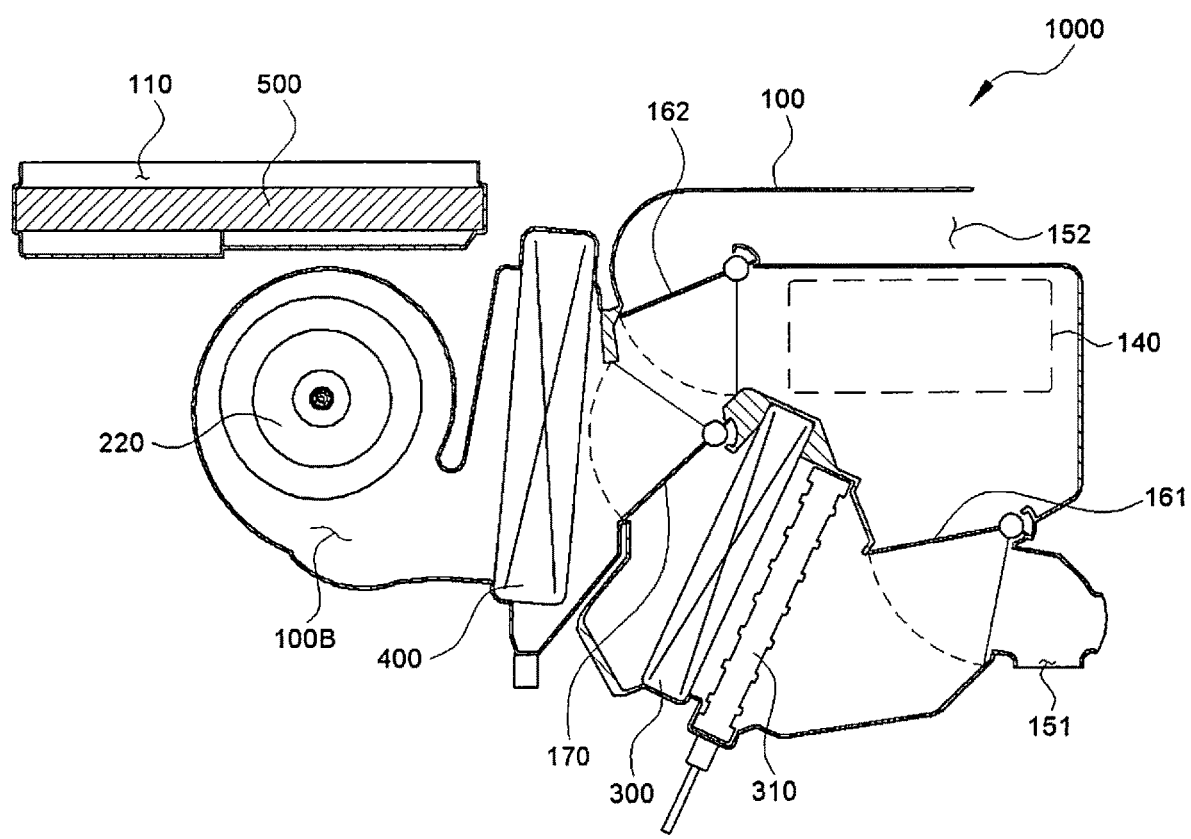

FIGS. 2 and 3 are perspective views illustrating an air conditioner 1000 for a vehicle according to the present invention when viewed from different directions, respectively, FIG. 4 is a top view of the air conditioner 1000 for a vehicle according to the present invention, and FIGS. 5 to 7 are cross-sectional views taken along line A-A', line B-B', and line C-C' of FIG. 4.

The air conditioner 1000 for a vehicle according to the present invention includes an air conditioning case 100, an interior heat exchanger 300, and an auxiliary heating heat exchanger 310.

The air conditioning case 100 is a portion which is in communication with the interior of the vehicle and in which wind for conditioning air of the interior flows, and includes a means blowing air to the interior to cool or heat the interior and adjusting the flow. This will be described again below.

The interior heat exchanger 300 is a means disposed in the air conditioning case 100 and heating air discharged to the interior of the vehicle.

The auxiliary heating heat exchanger 310, which is a means disposed together with the interior heat exchanger 300 in the air conditioning case 100 and heating the air, may use various types including a positive temperature coefficient (PTC) heating means.

In this case, in the air conditioner 1000 for a vehicle according to the present invention, it is preferable that even though the auxiliary heating heat exchanger 310 may be provided in an engine room rather than in the interior of the vehicle to secure safety of a passenger even though a form requiring a high voltage is used.

A first region 100A in which air for heating is blown and a second region 100B in which air for cooling is blown are formed in the air conditioning case 100, a first blower 210 is provided in the first region 100A, a second blower 220 is provided in the second region 100B, and the air conditioning case 100 includes an evaporator 400 cooling the air blown from the second region 100B.

The interior heat exchanger 300 and the auxiliary heating heat exchanger 310, which are components in charge of heating, heat the air blown from the first region 100A by an operation of the first blower 210, and the evaporator 400, which is a component in charge of cooling, cools the air blown from the second region 100B by an operation of the second blower 220.

In this case, an external air introducing port 110 through which external air is introduced and an internal air introducing port 120 through which internal air is introduced are formed in the air conditioning case 100 so that the air is introduced into the first region 100A and the second region 100B. In addition, a first internal/external air door 131 selectively opening and closing the internal air introducing port 120 and the external air introducing port 110 to adjust the internal air and the external air introduced into the first region 100A is provided in the first region 100A of the air conditioning case 100, and a second internal/external air door 132 selectively opening and closing the internal air introducing port 120 and the external air introducing port 110 to adjust the internal air and the external air introduced into the second region 100B is provided in the second region 100B of the air conditioning case 100.

In FIGS. 2 and 3, an example in which the external air introducing port 110 is formed at an upper side of the air conditioning case 100 and a filter 500 is further provided below the external air introducing port 110 is illustrated. Therefore, in the air conditioner 1000 for a vehicle according to the present invention, it is possible to prevent foreign materials such as fine dust, or the like, included in the external air from being introduced into the interior of the vehicle by the filter 500.

In addition, the air conditioning case 100 includes an interior discharging port 140 through which the air passing through the interior heat exchanger 300 or the evaporator 400 is supplied to the interior of the vehicle; a first air exhausting port 151 through which the air passing through the interior heat exchanger 300 is exhausted to the outside of the interior; and a second air exhausting port 152 through which the air passing through the evaporator 400 is exhausted to the outside of the interior. In this case, a first temperature door 161 adjusting an opening level of the interior discharging port 140 and the first air exhausting port 151 and a second temperature door 162 adjusting an opening level of the interior discharging port 140 and the second air exhausting port 152 according to cooling and heating settings are operated. That is, the first temperature door 161 is a means adjusting an amount in which the air passing through the interior heat exchanger 300 is discharged to the interior discharging port 140 to be in charge of interior heating and an amount in which the air passing through the interior heat exchanger 300 is discharged to the first air exhausting port 151 to be thrown out to the outside, and the second temperature door 162 is a means adjusting an amount in which the air passing through the evaporator 400 is discharged to the interior discharging port 140 to be in charge of interior cooling and an amount in which the air passing through the evaporator 400 is discharged to the second air exhausting port 152 to be thrown out to the outside.

In addition, the air conditioner 1000 for a vehicle according to the present invention may include the air conditioning case 100 in the engine room, be easily connected to the interior of the vehicle, and be miniaturized by forming the internal air introducing port 120 and the interior discharging port 140 in the same surface of the air conditioning case 100.

The air conditioner 1000 for a vehicle according to the present invention may further include an adjusting door 170 adjusting a level at which the air passing through the evaporator 400 passes through the interior heat exchanger 300, such that a temperature and dehumidification may be set.

A form illustrated in FIGS. 2 to 7 illustrates an example in which the auxiliary heating heat exchanger 310 is provided in parallel with the interior heat exchanger 300 behind the interior heat exchanger 300 in an air flow direction, and FIGS. 8A to 9B are views illustrating a maximum heating state and a maximum cooling state of the air conditioner 1000 for a vehicle according to the form illustrated in FIGS. 2 to 7.

Figure 8A:
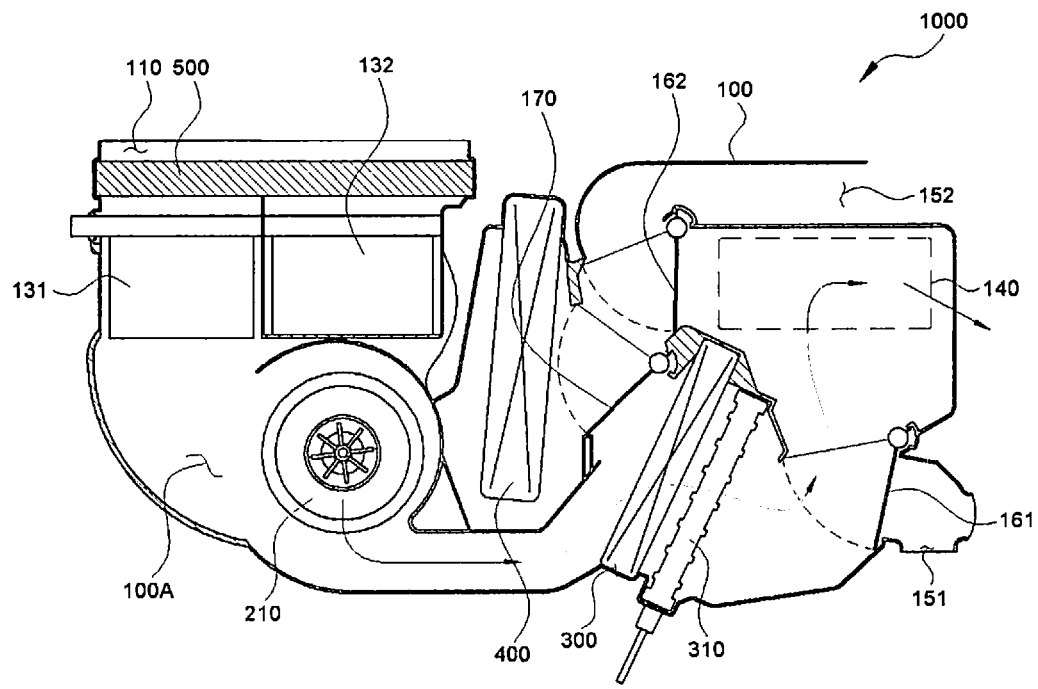
FIGS. 8A and 8B are views illustrating a maximum heating state of the air conditioner for a vehicle according to the present invention.
Figure 8B:
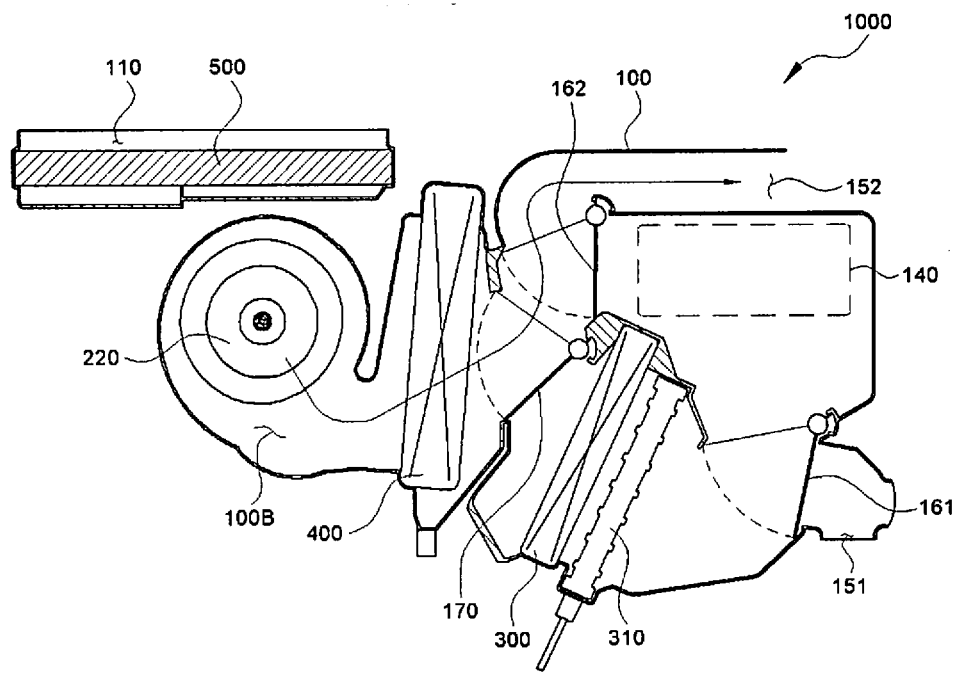

First, in the maximum heating state, as illustrated in FIG. 8A, the air introduced into the first region 100A through the first blower 210 is heated while passing through the interior heat exchanger 300 and the auxiliary heating heat exchanger 310 and is then entirely supplied to the interior of the vehicle through the interior discharging port 140, and as illustrated in FIG. 8B, the air introduced into the second region 100B through the second blower 220 passes through the evaporator 400 and is then entirely exhausted through the second air exhausting port 152.

In this case, the first temperature door 161 opens the interior discharging port 140 and closes the first air exhausting port 151, the second temperature door 162 closes the interior discharging port 140 and opens the second air exhausting port 152, and the adjusting door 170 closes a flow between the evaporator 400 and the interior heat exchanger 300, such that the air passing through the evaporator 400 is entirely exhausted to the second air exhausting port 152.

Figure 9A:
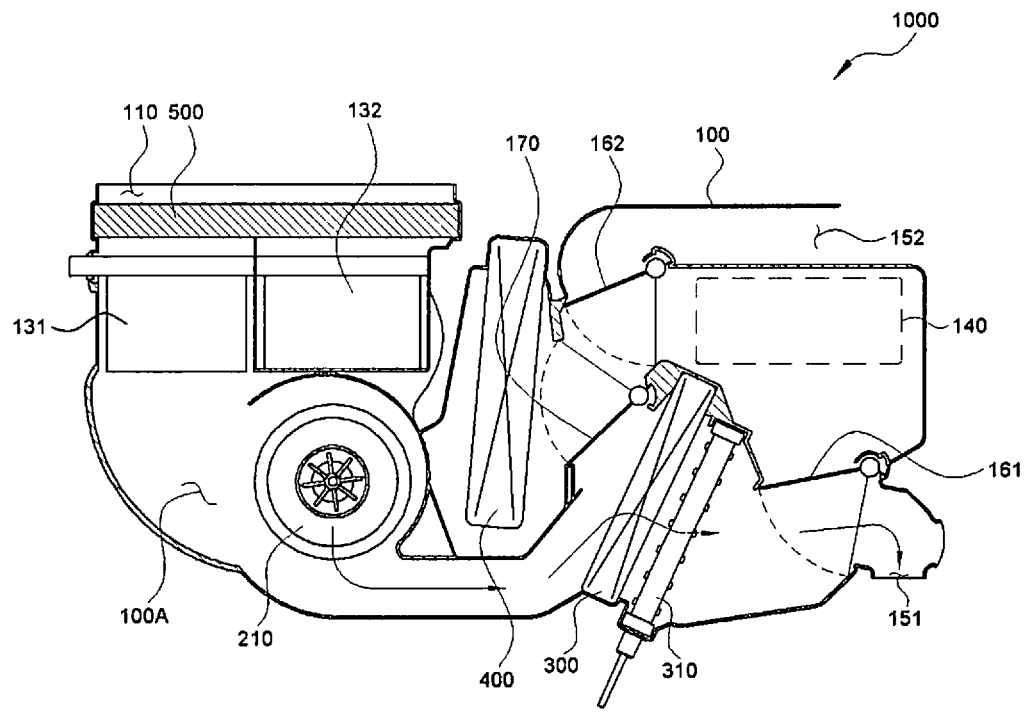
FIGS. 9A and 9B are views illustrating a maximum cooling state of the air conditioner for a vehicle according to the present invention.
Figure 9B:
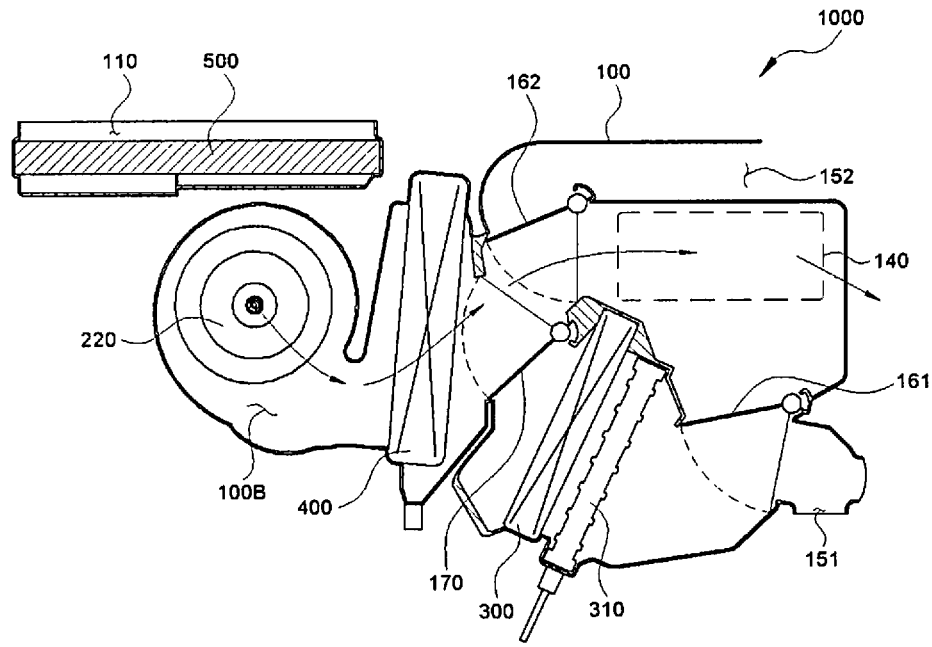

In addition, in the maximum cooling state, as illustrated in FIG. 9A, the air introduced into the first region 100A through the first blower 210 passes through the interior heat exchanger 300 and the auxiliary heating heat exchanger 310 and is then entirely exhausted through the first air exhausting port 151, and as illustrated in FIG. 9B, the air introduced into the second region 100B through the second blower 220 is cooled while passing through the evaporator 400 and is then entirely supplied to the interior of the vehicle through the interior discharging port 140.

In this case, the first temperature door 161 closes the interior discharging port 140 and opens the first air exhausting port 151, and the second temperature door 162 opens the interior discharging port 140 and closes the second air exhausting port 152.

Additionally, in a case in which dehumidification cooling is performed, only the second blower 220 may be operated, and the air passing through the evaporator 400 passes through the interior heat exchanger 300 by the adjusting door 170, such that moisture contained in the cooled air may be removed.

Figure 10:
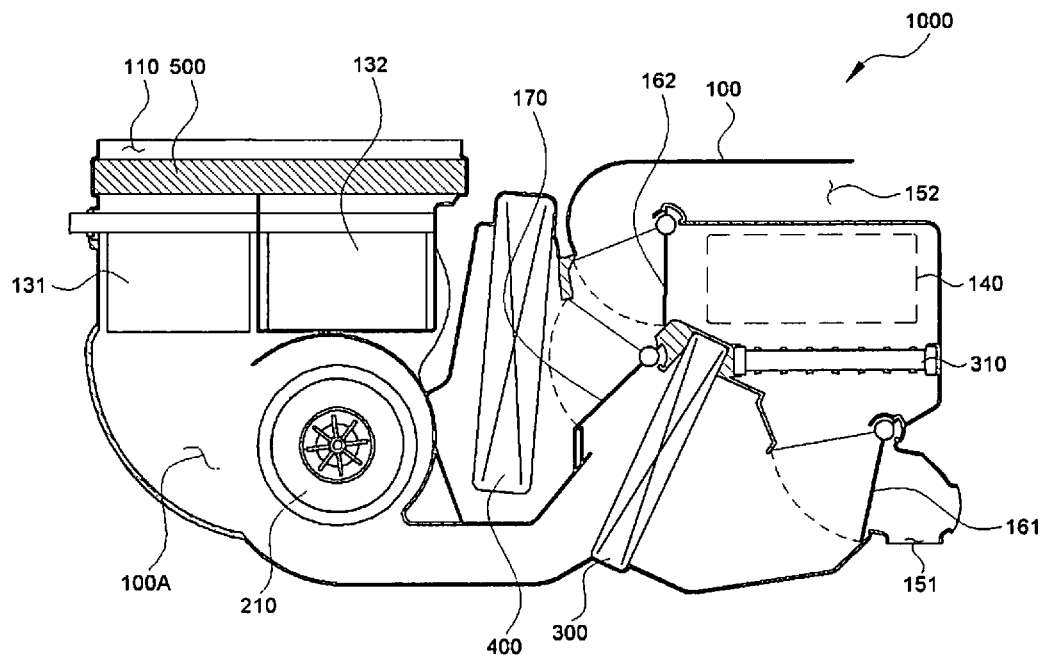
FIG. 10 is a view illustrating another example of the air conditioner for a vehicle according to the present invention.

FIG. 10 is a view illustrating another example of the air conditioner 1000 for a vehicle according to the present invention. In the air conditioner 1000 for a vehicle according to the present invention, the auxiliary heating heat exchanger 310 may be provided between the first temperature door 161 and the interior discharging port 140 to heat only air discharged to the interior.

Figure 11:
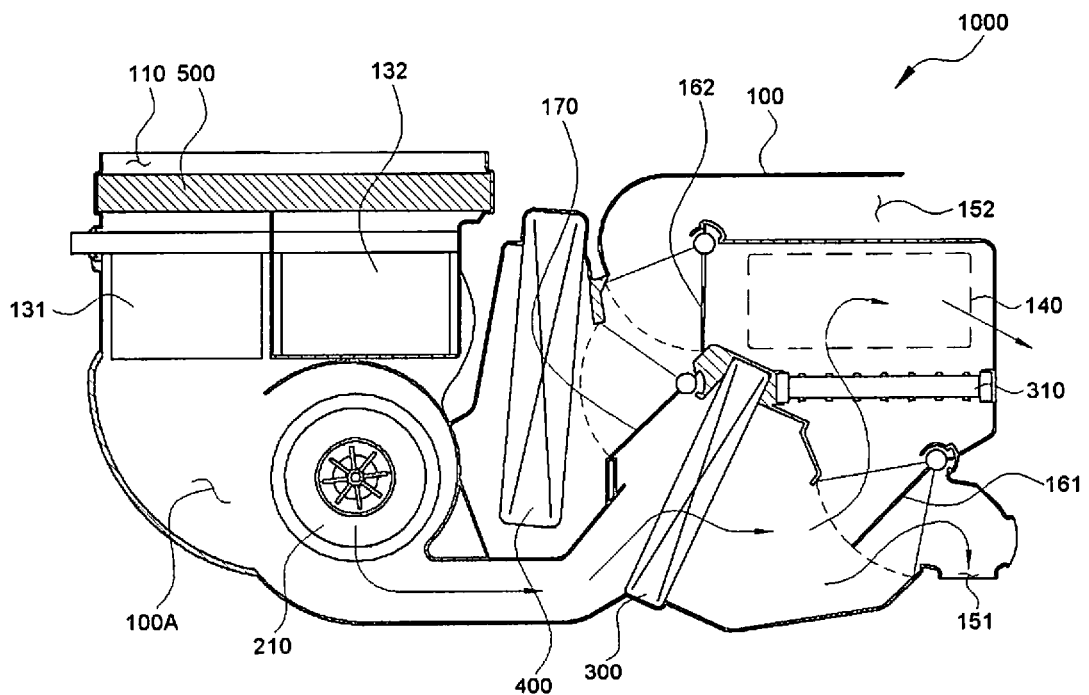
FIG. 11 is a view illustrating a heating state of FIG. 10.

FIG. 11 is a view illustrating a heating operation state of FIG. 10. The air passing through the first region 100A by the first blower 210 is primarily heated while passing through the interior heat exchanger 300, some of the air is exhausted to the outside and only the remaining air discharged to the interior of the vehicle through the interior discharging port 140 is secondarily heated while passing through the auxiliary heating heat exchanger 310 according to a setting of the first temperature door 161.

The air conditioner 1000 for a vehicle according to the present invention described above may improve heating performance by heating only the air discharged to the interior of the vehicle for the purpose of interior heating with the exception of the air exhausted to the outside of the interior.

Figure 12:
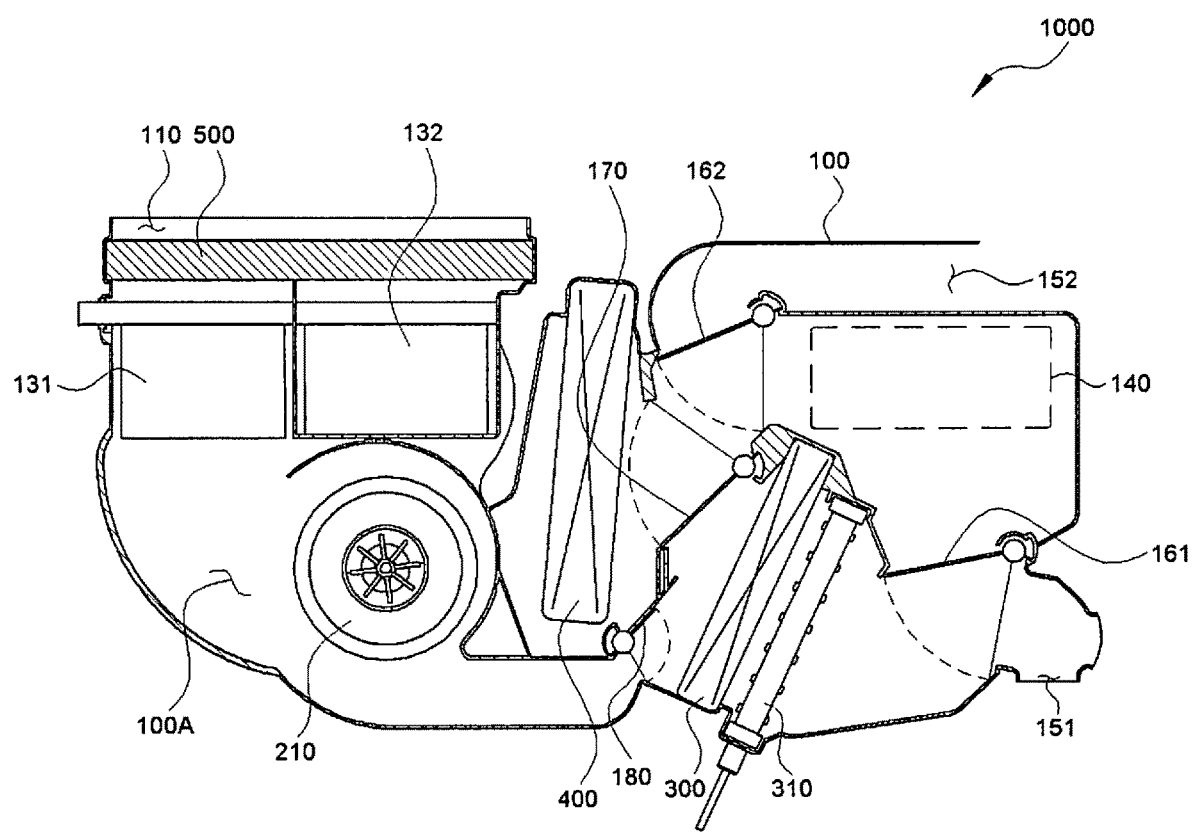
FIG. 12 is a view illustrating still another example of the air conditioner for a vehicle according to the present invention.
Figure 13:
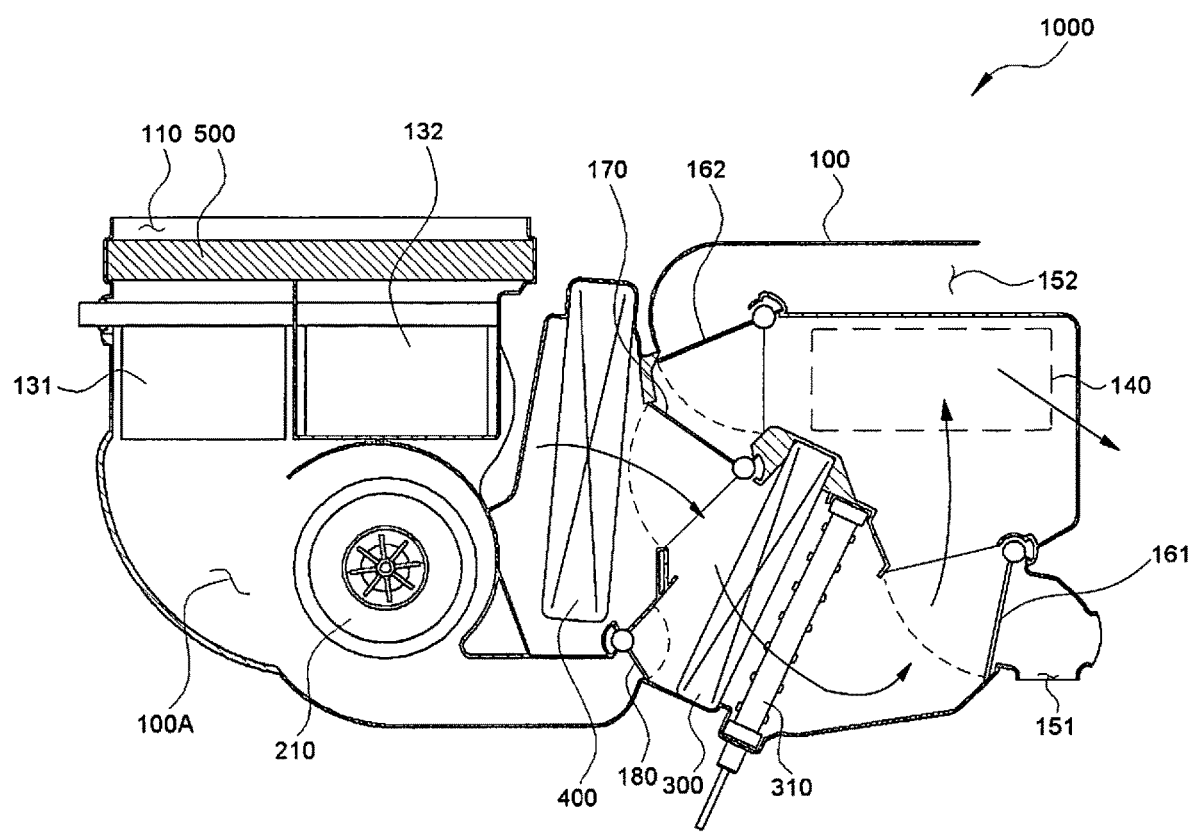
FIG. 13 is a view illustrating a dehumidifying state of FIG. 12.

FIG. 12 is a view illustrating still another example of the air conditioner 1000 for a vehicle according to the present invention, and FIG. 13 is a view illustrating a dehumidifying state of FIG. 12.

In the air conditioner 1000 for a vehicle according to the present invention illustrated in FIGS. 12 and 13, an example in which a backward flow preventing door 180 preventing the air passing through the evaporator 400 and moved to the interior heat exchanger 300 from flowing backward to the first region 100A is further formed is illustrated. The backward flow preventing door 180 opens and closes the first region 100A between the evaporator 400 and the interior heat exchanger 300 in order to prevent some of the air passing through the evaporator 400 from flowing backward to the first region 100A in a case in which the adjusting door 170 opens the interior heat exchanger 300, such that the air passing through the evaporator 400 passes through the interior heat exchanger 300.

The backward flow preventing door 180 opens the first region 100A at the time of maximum heating and cooling of the air conditioner 1000 for a vehicle to allow the air to be blown toward the interior heat exchanger 300 by an operation of the second blower 220.

In addition, in the air conditioner 1000 for a vehicle according to the present invention, at the time of performing an dehumidification operation, only the second blower 220 may be operated, and the air passing through the evaporator 400 passes through the interior heat exchanger 300 by the adjusting door 170, such that moisture contained in the cooled air may be removed. In this case, the backward flow preventing door 180 closes the first region 100A, such that moisture is removed from the air passing through the evaporator 400 and the adjusting door 170 while the air passing through the evaporator 400 and the adjusting door 170 passes through the interior heat exchanger 300, and the air from which the moisture is removed is exhausted through the interior discharging port 140. In FIG. 13, an example in which the first temperature door 161 closes the first air exhausting port 151 and the second temperature door 162 closes the second air exhausting port 152 is illustrated, but operations of the first temperature door 161 and the second temperature door 162 may be variously controlled according to a temperature setting.

Therefore, in the air conditioner 1000 for a vehicle according to the present invention, a dehumidifying mode may be performed by operating the second blower 220 without operating the first blower 210 using the adjusting door 170 and the backward flow preventing door 180, such that consumed power and generated noise may be reduced.

Therefore, in the air conditioner for a vehicle according to the present invention, heating performance may be improved using the auxiliary heating heat exchanger and stability of a passenger may be improved by providing the auxiliary heating heat exchanger in the engine room.

In this case, in the air conditioner for a vehicle according to the present invention, the auxiliary heating heat exchanger may be provided in parallel with the interior heat exchanger behind the interior heat exchanger in the flow direction and may be provided between the first temperature door and the interior discharging port, such that the air supplied through the second region may pass through only the evaporator and be supplied in a cooled state to secure a sufficient cooling air volume.

Particularly, in the air conditioner for a vehicle according to the present invention, the auxiliary heating heat exchanger may be provided between the first temperature door and the interior discharging port to heat only the air passing through the interior heat exchanger and discharged to the interior with the exception of air passing through the first air exhausting port, resulting in improvement of heating performance.

Further, the air conditioner for a vehicle according to the present invention is capable of including the air conditioning case in the engine room, being easily connected to the interior of the vehicle, and being miniaturized by forming the internal air introducing port and the interior discharging port in the same surface of the air conditioning case.

Further, the air conditioner for a vehicle according to the present invention is capable of reducing consumed power and generated noise by operating only the second blower in the second region using the backward flow preventing door preventing the air passing through the evaporator and moved to the interior heat exchanger from flowing backward to the first region to perform the dehumidifying mode.

Further, the air conditioner for a vehicle according to the present invention is capable of stably implementing cooling, heating, and dehumidifying modes by operations of the first temperature door, the second temperature door, the adjusting door, and the backward flow preventing door.

DETAILED DESCRIPTION OF MAIN ELEMENTS

1000: air conditioner for vehicle
100: air conditioning case

| | |
|---|---|
| 100A: first region | 100B: second region |
| 110: external air introducing port | |
| 120: internal air introducing port | |
| 131: first internal/external air door | 132: second internal/external air door |
| 140: interior discharging port | |
| 151: first air exhausting port | 152: second air exhausting port |
| 161: first temperature door | 162: second temperature door |
| 170: adjusting door | |
| 180: backward flow preventing door | |
| 210: first blower | 220: second blower |
| 300: interior heat exchanger | |
| 310: auxiliary heating heat exchanger | |
| 400: evaporator | |
| 500: filter | |

What is claimed is:

1. An air conditioner for a vehicle, comprising:
an air conditioning case which is in fluid communication with the interior of the vehicle and in which wind for conditioning air of an interior flow; and
an interior heat exchanger and an auxiliary heating heat exchanger which are disposed in the air conditioning case and heat air discharged to the interior of the vehicle,
wherein the air conditioning case includes an evaporator disposed in the air conditioning case and cooling the air discharged to the interior of the vehicle;
wherein the air conditioning case comprises:
an interior discharging port through which the air passing through the interior heat exchanger or the evaporator is supplied to the interior of the vehicle;
a first air exhausting port through which the air passing through the interior heat exchanger is exhausted to the outside of the interior; and
a second air exhausting port through which the air passing through the evaporator is exhausted to the outside of the interior,
wherein the air conditioner for a vehicle further comprises:
a first temperature door adjusting an opening level of the interior discharging port and the first air exhausting port to adjust a flow of the air passing through the interior heat exchanger; and
a second temperature door adjusting an opening level of the interior discharging port and the second air exhausting port to adjust a flow of the air passing through the evaporator,
wherein the auxiliary heating heat exchanger is provided between the first temperature door and the interior discharging port and heats only the air discharged to the interior.

2. The air conditioner for a vehicle of claim 1, wherein the auxiliary heating heat exchanger uses a positive temperature coefficient.

3. The air conditioner for a vehicle of claim 1, wherein a first region in which air for heating is blown and a second region in which air for cooling is blown are formed in the air conditioning case, and
a first blower is provided in the first region and a second blower is provided in the second region.

4. The air conditioner for a vehicle of claim 1, further comprising an adjusting door adjusting a level at which the air passing through the evaporator passes through the interior heat exchanger.

5. The air conditioner for a vehicle of claim 4, further comprising a backward flow preventing door preventing the air passing through the evaporator and moved to the interior heat exchanger from flowing backward to the first region.

6. The air conditioner for a vehicle of claim 5, wherein the backward flow preventing door is capable of opening and closing the first region between the evaporator and the interior heat exchanger.

7. The air conditioner for a vehicle of claim 6, wherein in a dehumidifying mode state, the second blow is operated, and the first blower is not operated.

8. The air conditioner for a vehicle of claim 7, wherein in the dehumidifying mode state, the backward flow preventing door closes the first region, and the adjusting door is adjusted so that some or all of the air passing through the evaporator passes through the interior heat exchanger.

9. The air conditioner for a vehicle of claim 1, wherein the auxiliary heating heat exchanger is provided in parallel with the interior heat exchanger behind the interior heat exchanger in an air flow direction.

10. The air conditioner for a vehicle of claim 1, wherein in the air conditioning case, an external air introducing port through which external air is introduced and an internal air introducing port through which internal air is introduced are hollowed.

11. The air conditioner for a vehicle of claim 10, wherein the internal air introducing port and the interior discharging port are formed in the same surface of the air conditioning case.

12. The air conditioner for a vehicle of claim 10, further comprising:
a first internal/external air door adjusting introduction of the internal air and the external air into the first region; and
a second internal/external air door adjusting introduction of the internal air and the external air into the second region.

13. The air conditioner for a vehicle of claim 12, further comprising a filter disposed between the first and second internal/external air doors and the external air introducing port.

14. An air conditioner for a vehicle, comprising:
an air conditioning case which is in fluid communication with the interior of the vehicle and in which wind for conditioning air of an interior flow; and
an interior heat exchanger and an auxiliary heating heat exchanger which are disposed in the air conditioning case and heat air discharged to the interior of the vehicle,
wherein the air conditioning case includes an evaporator disposed in the air conditioning case and cooling the air discharged to the interior of the vehicle; and
wherein the air conditioning case includes:
an interior discharging port through which the air passing through the interior heat exchanger or the evaporator is supplied to the interior of the vehicle;
a first air exhausting port through which the air passing through the interior heat exchanger is exhausted to the outside of the interior; and
a second air exhausting port through which the air passing through the evaporator is exhausted to the outside of the interior.

15. An air conditioner for a vehicle, comprising:
an air conditioning case which is in fluid communication with the interior of the vehicle and in which wind for conditioning air of an interior flow; and an interior heat exchanger and an auxiliary heating heat exchanger which are disposed in the air conditioning case and heat air discharged to the interior of the vehicle, wherein the auxiliary heating heat exchanger is provided in parallel with the interior heat exchanger behind the interior heat exchanger in an air flow direction, and wherein the auxiliary heating heat exchanger is provided between the first temperature door and the interior discharging port and heats only the air discharged to the interior.

* * * * *